H. N. OTT.
MICROSCOPE.
APPLICATION FILED APR. 5, 1915.
1,167,425.
Patented Jan. 11, 1916.
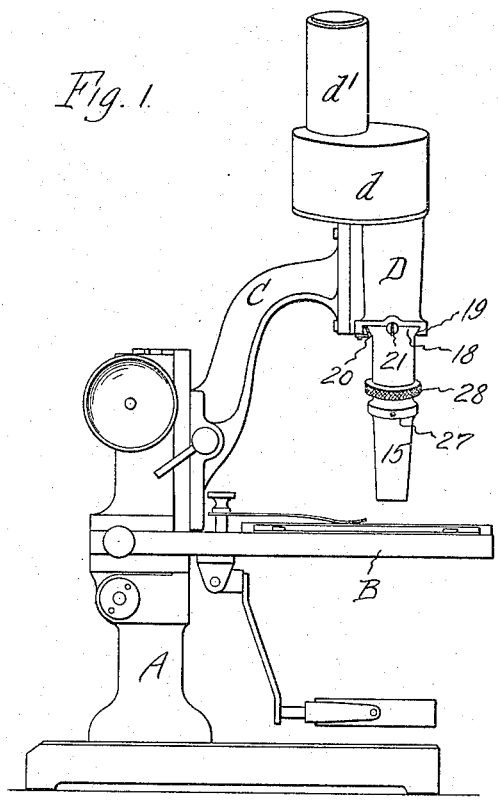
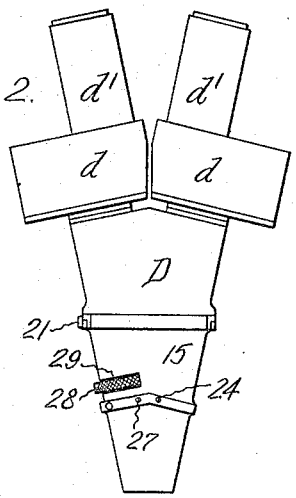
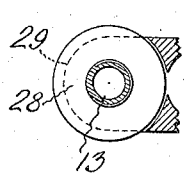
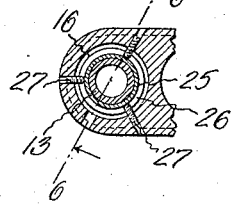
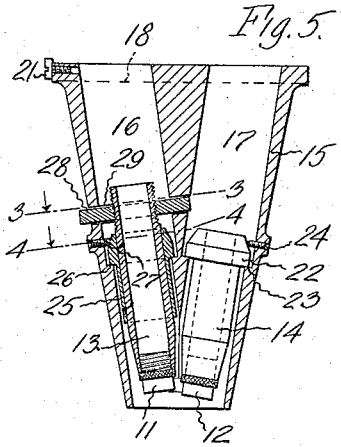
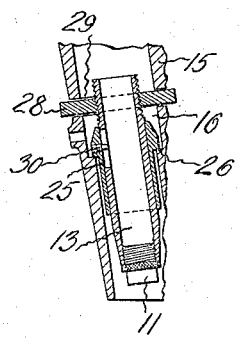
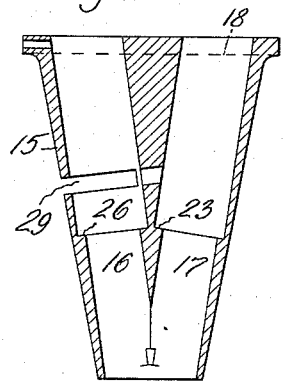
Witnesses
A. G. Dumond.
A. B. McGee.
Inventor:
Harvey N. Ott,
by Wilhelm & Parker
Attorneys.

UNITED STATES PATENT OFFICE.

HARVEY N. OTT, OF BUFFALO, NEW YORK, ASSIGNOR TO SPENCER LENS COMPANY, OF BUFFALO, NEW YORK.

MICROSCOPE.

1,167,425.   Specification of Letters Patent.   Patented Jan. 11, 1916.

Application filed April 5, 1915. Serial No. 19,107.

*To all whom it may concern:*

Be it known that I, HARVEY N. OTT, a citizen of the United States, residing at Buffalo, in the county of Erie and State of New York, have invented a new and useful Improvement in Microscopes, of which the following is a specification.

This invention relates to improvements in microscopes and more particularly to supporting and adjusting means for the objectives of binocular microscopes.

In binocular microscopes, as ordinarily constructed, the lenses of the two objectives are mounted in tubes which are separately secured at their upper ends to and extend downwardly from a carrying plate or member adapted to be removably secured to the body tube of the microscope, the objective tubes being adjustably secured to the carrying member so that they can be adjusted into proper relation to each other. The objectives are thus exposed and unprotected and since they are disconnected except at their upper ends, and the adjustable securing means are relatively small and frail, the adjustment is very apt to be and frequently is disturbed in handling the objectives. It is also usual with such constructions to provide a separate holder in which the objectives are placed to protect them from injury when removed from the microscope.

One object of the invention is to provide a shell or container within which the objectives of a binocular microscope are mounted and protected from injury, and which can be readily placed in position on and removed from the microscope without danger of disturbing the adjustment of the objectives, which are mounted in the shell or container so that they can be adjusted to properly focus at a common point.

Another object is to mount one of the objectives in the protecting shell or container so that it can also be readily adjusted axially to correct for inequalities of vision in the eyes of the user.

In the accompanying drawings: Figure 1 is a side elevation of a binocular microscope embodying the invention. Fig. 2 is a front elevation of the body tube thereof. Figs. 3 and 4 are fragmentary cross-sections, on an enlarged scale, of the objective container, in lines 3—3 and 4—4, respectively, Fig. 5. Fig. 5 is a sectional elevation of the container and the objectives therein. Fig. 6 is a fragmentary sectional elevation thereof in line 6—6, Fig. 4. Fig. 7 is a sectional elevation of the container with the objectives removed therefrom.

A represents the stand, B the stage, C the tube-supporting arm, and D the body tube of a binocular microscope. These parts constitute no part of the invention and may be of any usual or suitable construction. As shown, the body tube is provided with the usual prism chambers $d$ containing prisms for erecting the image and carrying the eye pieces $d'$.

11 and 12 indicate the two objectives which, as usual, are mounted in the lower ends of two tubes 13 and 14. These objective tubes instead of depending from a carrying member at their upper ends and being exposed or uninclosed below said carrying member, as in the usual construction heretofore employed, are mounted in and carried by a shell or container 15 which is removably secured at the lower end of the body tube D and constitutes, in effect, a removable extension thereof. The shell or container preferably tapers downwardly in conformity with the taper of the body tube D and is provided with downwardly converging longitudinal holes or chambers 16 and 17 in which the objective tubes 13 and 14 are arranged at an angle to each other so as to focus at a common point. The shell or container can be removably secured in place on the miscroscope in any suitable way. As shown, it is provided with a dovetailed upper end 18 adapted to slide into a transverse dove-tailed groove 19 in the lower end of the body tube. One side of this groove is preferably formed by a spring strip 20 which holds the container frictionally in place and prevents play thereof in the groove 19.

21 is a stop screw adapted to strike the end of the body tube to limit the movement of the container into the groove.

The objective tubes are adjustably mounted in the shell or container preferably in the following manner: One of the objective tubes, as 14, is provided with a flange or shoulder 22 at its upper portion which rests on an internal shoulder 23 in the chamber 17 of the container and is adjustably secured thereon by the usual screws 24 which are disposed at suitable points around the objective tube and engage the beveled upper end thereof. The other objective tube, 13, is telescopically arranged in a guide tube 25 in which it is adapted to be adjusted endwise or axially, and the guide tube 25 is adjustably secured in the chamber 16 of the container in the same manner as the first objective tube, 14, that is, the guide tube is provided with a shoulder 26 which is adjustably clamped on an internal shoulder in the chamber 16 of the container by screws 27 engaging the beveled upper end of the guide tube. The upper end of the objective tube 13 is screwthreaded and is engaged by a nut 28 which is held from endwise movement but is adapted to turn in a transverse slot 29 in the wall of the container 15 intersecting the chamber 16. The knurled edge of this nut extends out through the slot 29 so that it can be readily turned for adjusting the objective tube axially. The objective tube 13 is held from rotation when the nut is turned, by suitable means, such as a small screw 30, see Fig. 6, extending through the guide tube 25 into a longitudinal slot in the objective tube. Both of the objective tubes can thus be adjusted laterally in the shell or container by means of the securing screws 24 and 27, so that they will properly focus at a common point, and the objective tube 13 can also be adjusted axially by means of the nut 28 to correct for inequality of vision in the eyes of the user. The axial adjustment of the objective tube 13 is not sufficient to objectionally affect the use of the microscope. The objectives nevertheless do not extend beyond the container and are inclosed and protected throughout their length in the container, which preferably extends slightly beyond the lower ends of the objectives. The objectives therefore cannot be grasped or struck and their adjustment disturbed in placing them on or removing them from the microscope or in otherwise handling them. The container also avoids the necessity for a separate case or holder for the objectives when they are not in use.

I claim as my invention:

1. The combination of two objectives for a binocular microscope, and a container which is adapted to be removably secured on the microscope and within which said objectives are mounted in converging relation to each other, said objectives being protected by surrounding portions of the container.

2. The combination of two objectives for a binocular microscope, and a container which is adapted to be removably secured on the microscope and within which said objectives are mounted in converging relation to each other, said container having protecting walls which surround the objectives and extend substantially to the outer ends thereof.

3. The combination of two objectives for a binocular microscope, a container which is adapted to be removably secured on the microscope and within which said objectives are mounted in converging relation to each other, said objectives being protected by surrounding portions of the container, and means for adjusting said objectives in the container relative to each other.

4. The combination of two objectives for a binocular microscope, a container which is adapted to be removably secured on the microscope and within which said objectives are mounted in converging relation to each other, said objectives being protected by surrounding portions of the container, means for adjusting said objectives laterally in the container relative to each other, and means for adjusting one of said objectives axially.

5. The combination of two objectives for a binocular miscroscope, and a container which is adapted to be removably secured on the miscroscope and which is provided with converging chambers in which said objectives are mounted with the outer ends of the objectives surrounded and protected by the walls of said chambers.

6. The combination of two objectives for a binocular microscope, a tube carrying each of said objectives, and a container which is adapted to be removably secured on the microscope and within which said objective tubes are mounted in converging relation to each other with the outer ends of the objectives located about at the end of said container.

7. The combination of two objectives for a binocular microscope, a tube carrying each of said objectives, a container which is adapted to be removably secured on the microscope and within which said objective tubes are mounted in converging relation to each other, and means for securing said objective tubes in said container and adjusting them laterally relative to each other.

8. The combination of two objectives for a binocular microscope, a tube carrying each of said objectives, a container which is adapted to be removably secured on the microscope and within which said objective tubes are mounted in converging relation to each other, a guide tube in which one of said objective tubes is movable axially, means for adjusting said guide tube and said other objective tube laterally relative to each other, and means for axially adjusting the first mentioned objective tube.

9. The combination of two objectives for a binocular microscope, a tube carrying each of said objectives, a container which is adapted to be removably secured on the microscope and within which said objective tubes are mounted in converging relation to each other, a guide tube in which one of said objective tubes is movable axially, and means for axially adjusting said objective tube.

10. The combination of two objectives for a binocular microscope, a tube carrying each of said objectives, a container which is adapted to be removably secured on the microscope and within which said objective tubes are mounted in converging relation to each other, a guide tube in which one of said objective tubes is movable axially, and a screw device for axially adjusting said objective tube.

11. The combination of two objectives for a binocular microscope, a tube carrying each of said objectives, a container which is adapted to be removably secured on the microscope and within which said objective tubes are mounted in converging relation to each other, a guide tube in which one of said objective tubes is movable axially, and a nut having a screwthreaded engagement with said objective tube and extending out through a slot in the container for axially adjusting said objective tube.

Witness my hand, this 2nd day of April, 1915.

HARVEY N. OTT.

Witnesses:
A. O. POTTER,
EDWARD E. TROST.

Copies of this patent may be obtained for five cents each, by addressing the "Commissioner of Patents, Washington, D. C."